US008597446B2

(12) United States Patent
Torriani et al.

(10) Patent No.: US 8,597,446 B2

(45) Date of Patent: Dec. 3, 2013

(54) METHOD FOR PRODUCING A LIGHTWEIGHT COMPONENT, AND SUPPORT ELEMENT

(75) Inventors: Laurent Torriani, Lamboing (CH); Mario Lehmann, Les Pommerats (CH); Marcel Aeschlimann, Ligerz (CH)

(73) Assignee: Woodwelding AG, Zug (CH)

( * ) Notice: Subject to any disclaimer, the term of this patent is extended or adjusted under 35 U.S.C. 154(b) by 340 days.

(21) Appl. No.: 13/126,005

(22) PCT Filed: Oct. 27, 2009

(86) PCT No.: PCT/CH2009/000343

§ 371 (c)(1), (2), (4) Date: Jun. 27, 2011

(87) PCT Pub. No.: WO2010/048735

PCT Pub. Date: May 6, 2010

(65) Prior Publication Data

US 2011/0272078 A1 Nov. 10, 2011

(30) Foreign Application Priority Data

Oct. 28, 2008 (CH) .................................... 1690/08

(51) Int. Cl.
*B32B 37/00* (2006.01)

(52) U.S. Cl.
USPC .......................... 156/73.1; 156/308.2; 428/99

(58) Field of Classification Search
USPC ............ 156/73.1, 73.5, 308.2, 308.4; 428/99; 264/442, 443, 444, 445
See application file for complete search history.

(56) References Cited

U.S. PATENT DOCUMENTS

| | | | | |
|---|---|---|---|---|
| 5,965,238 | A | 10/1999 | Saitoh et al. | |
| 6,502,341 | B1 * | 1/2003 | Truc | 40/702 |
| 6,607,798 | B1 * | 8/2003 | Watanabe et al. | 428/36.5 |
| 7,892,631 | B2 * | 2/2011 | Bauer | 428/218 |
| 8,176,704 | B2 * | 5/2012 | Gauss et al. | 52/717.05 |

FOREIGN PATENT DOCUMENTS

| | | | |
|---|---|---|---|
| DE | 202006010157 | U1 | 11/2007 |
| EP | 1640128 | A1 | 3/2006 |
| EP | 1698738 | A2 | 9/2006 |
| EP | 1731236 | A1 | 12/2006 |
| EP | 1932637 | A2 | 6/2008 |
| EP | 1961533 | A1 | 8/2008 |

* cited by examiner

*Primary Examiner* — James Sells

(74) *Attorney, Agent, or Firm* — Rankin, Hill & Clark LLP

(57) ABSTRACT

The lightweight component is equipped with two cover layers, which are made of a wood material, for example, and a filling disposed in between said layers after cutting everything to size, having an edge support comprising thermoplastic material. This is done in that the edge support is anchored both in the first cover layer and in the second cover layer starting from the narrow side, wherein the anchoring is achieved in that the edge support is brought into contact with the respective cover layer and mechanical vibrations are coupled into the edge support by a sonotrode engaging from the narrow side, wherein the edge support at the same time is pressed against the cover layer such that in the region of a transition between the thermoplastic material and the wood material of the cover layer part of the thermoplastic material is liquefied and pushed into the cover layer material, thereby producing a positively engaged anchoring after hardening.

15 Claims, 5 Drawing Sheets

METHOD FOR PRODUCING A LIGHTWEIGHT COMPONENT, AND SUPPORT ELEMENT

BACKGROUND OF THE INVENTION

FIELD OF THE INVENTION

The invention relates to lightweight building boards, as used in lightweight construction and the furniture industry.

Such lightweight building boards consist of two outer, relatively thin cover layers, for example particleboards, and a filling, for example a honeycomb structure made of card, arranged between the cover layers. Lightweight building boards of this type are mechanically very stable, lightweight, and can look attractive if the edges are finished neatly. Specifically because of their low weight and also because of the low consumption of resources in their production, they are becoming increasingly popular.

Edges (decorative edges) for such lightweight building boards are, for example, plastic strips sealed on the outer surface and provided with a suitable decoration, and may furthermore be provided with an adhesive on the rear side. Decorative edges formed as veneer edges are also available.

However, finishing the edges in such a way as to obtain an attractive appearance has, to some extent, not yet been satisfactorily accomplished. In particular, for the production of ready-made and mass-produced products, it would be desirable if a cut-to-size lightweight building board could be provided with an edge by a craftsman after the cutting-to-size operation, without involving great effort and using available tools.

For the secure fastening of the edge, the prior art discloses on the one hand the provision of a so-called crosspiece, that is a particle profile completely filling the intermediate space between the cover layers in the region of the edge. A commercially available edge of the desired type can then be adhesively attached to such a crosspiece. Such crosspieces are mechanically very stable. However, they contribute significantly to the overall weight of the board and can only be retrofitted with considerable effort. They are therefore suitable in particular for fitting at the time that the lightweight building board is made, and consequently particularly for industrial production.

On the other hand, so-called support edges are known. These are plastic strips or plastic laths which are attached to the edge between the cover layers, the cover layers generally also being milled on the inside. The actual edge with the decoration is then glued onto this support edge. The document EP 1 640 128 shows as a variant a method in which the edge is glued onto the support edge before the support edge is attached.

The support edge technique is also quite laborious and necessitates the use of machines especially provided for the support edges. For anything other than industrial production, their use entails disadvantages and is even virtually impossible.

BRIEF SUMMARY OF THE INVENTION

It is consequently an object of the invention to provide a method for producing a lightweight component and a support element intended for such a method that overcome disadvantages of the prior art and, in particular, are also suitable for non-industrial production.

According to one aspect of the invention, it is proposed to provide the lightweight component having two cover layers, for example of wood or a derived timber material, and a filling arranged in between with an edge support comprising a thermoplastic material (generally a plastic containing a thermoplastic polymer) after the cutting-to-size operation. This takes place in such a way that said edge support is anchored from the narrow side both in the first cover layer and in the second cover layer, wherein the anchorage is achieved by the edge support being brought into contact with the respective cover layer and mechanical vibrations being coupled into the edge support by a sonotrode approaching from the narrow side (that is to say, not through the cover layers), wherein the edge support at the same time is pressed against this cover layer in such a way that, in the region of a transition between the thermoplastic material and the derived timber material of the cover layer, part of the thermoplastic material is liquefied and forced into the cover layer material, thereby producing a positively engaging anchorage after hardening. This is carried out with one extended edge support in a continuous process or with a plurality of edge supports in a repeated process until an extended region of the narrow side ('extended' means, for example, that the 'horizontal' extent along the narrow side is much greater than the thickness of the lightweight component) is provided with the edge support or with the edge supports (and under some circumstances with intermediate spaces between them). Furthermore, an edge is fastened to the edge support or to the edge supports in such a way that, in said extended region, the intermediate space between the cover layers is closed toward the narrow side.

According to a further aspect of the invention, a method for fastening an edge to a lightweight component having two cover layers and a filling arranged in between is provided, the method comprising the following method steps:

- providing an edge support (3) comprising a thermoplastic material;
- anchoring the edge support (3) in both cover layers (1.1, 1.2), the anchorage taking place by the edge support being brought into contact with the respective cover layer and energy being coupled into the edge support, the edge support (3) at the same time being pressed against this cover layer (1.1, 1.2) in such a way that, in the region of a transition between the thermoplastic material and the cover layer, part of the thermoplastic material is liquefied and forced into the cover layer, whereby a positively engaging anchorage is obtained after hardening of the thermoplastic material;
- carrying out or repeating the anchorage until an extended region of the narrow side is provided with the edge support (3) or with a plurality of edge supports (3);
- fastening an edge (11; 14) to an outer surface of the edge support in such a way that, in said extended region, the intermediate space between the cover layers is closed toward the narrow side.

According to the first aspect, the supplying of energy may take place by a sonotrode, through which vibrations are coupled into the edge support. The vibrations can be coupled into the edge support in such a way that they are transmitted through the latter to an interface with the cover layers and the liquefaction takes place as a result of the friction between the cover layer and the thermoplastic material and/or internal friction of the thermoplastic material (for example assisted by energy directors) in the region of the interface with the cover layers. As a variant, the liquefaction may also be brought about in contact with a counter element, which may, for example, engage behind an edge support in an L-shaped manner and with which the pressure of the sonotrode is opposed. However, the coupling may also take place by the liquefaction taking place directly in contact with the sonotrode, i.e. the mechanical vibrations are coupled in with a depth of penetration that under some circumstances is restricted. Also in these embodiments, the liquefied thermoplastic material is pressed outward and into structures of the cover layers by the compressive force. In this case, the sonotrode may, for example, engage behind the edge support in an L-shaped manner, so that the liquefaction takes place on the inside of the edge support with respect to the lightweight component. A counter element acting from the outside is used to exert a force counter to the pressing force of the sonotrode.

With regard to the liquefaction in direct contact with the sonotrode or a counter element, attention is also drawn to the document WO 2009/052 644, to the content of which reference is expressly made here.

The supplying of energy may alternatively also be brought about in some other way, mechanically, by heating or by radiation coupled in for example through the edge support, which is absorbed at the roughened or for some other reason absorbent interface between the edge support and the cover layer.

Terms concerning the spatial orientation such as “horizontal” or “vertical”, “upper side”, “underside”, etc. are used in the present text to make it easier to read. They relate to the lightweight component when it has been placed with a flat side on a planar surface, with the cover layers horizontal. They should not of course be interpreted as meaning that the method described only works in this orientation. It goes without saying that—particularly for relatively small lightweight components—it can also be carried out, for example, with the lightweight component oriented vertically or with the lightweight component held at an angle.

The procedure according to the invention produces the important advantage that it allows the use of a relatively low-cost element—the edge support—which can also be used with simple means—that is, for example, an ultrasonic device with a sonotrode. The ultrasonic device with the sonotrode may be a portable device (‘handheld device’) or a device similar to a fixedly installed drilling machine carried by a frame, with which it is possible to carry out not only the fastening of the edge support but also other working steps. The ultrasonic device may also be a customary stationary ultrasonic machine, as also known for industrial applications; the procedure according to the invention is also suitable for industrial application.

The procedure according to the invention also makes it possible that the filling in the region of the narrow side does not have to be cleared out—and is preferably used as such. Even if it comprises regions running between the cover layers in the final state, the edge support requires little depth, and, given sufficiently flexible filling material, said material can be readily forced in.

Furthermore, the invention makes it possible that the cover layers do not have to be pretreated—for example by providing channels, grooves, etc.—i.e. the at least one edge support is preferably fastened after the cutting-to-size operation, without method steps that are specifically designed for the edge support, although such steps are not ruled out.

The fastening of the edge preferably takes place after the anchorage of the edge support(s). Between the anchoring step and the edge-fastening step, it is possible, for example, for projecting parts of the edge, and possibly of the edge support (s), also to be milled off. If the fastening takes place after the anchorage of the edge support(s), it is also possible in particular for curved or angled-away narrow sides to be edged, without excessive stresses occurring.

However, the edge may also be fastened before the anchorage of the edge support; this can already take place during production, i.e. the edge may be constructed during production in such a way that it comprises the edge support. This also includes edge/edge-support assemblies produced as one piece, i.e. in this embodiment the edge and the edge support (s) may also be an integrated, homogeneous or heterogeneous component. The coupling-in of the mechanical oscillations then takes place through the edge; the sonotrode therefore acts on the outside of the edge.

During the anchorage of the edge support, a supporting force that is directed inward—that is to say toward the other cover layer respectively—is preferably exerted on the cover layer or the cover layers. This supporting force prevents the cover layers from coming apart when the supporting edges are introduced; this helps, inter alia, to maintain the thickness tolerances of the lightweight building board.

According to the first aspect of the invention, the sonotrode acts from the narrow side, therefore does not act through the cover layers. Nevertheless, the edge support preferably lies substantially between the cover layers after the anchorage, that is to say projects at most a little, and preferably not at all, beyond the cover layers on the rear side (i.e. a large part of the volume, for example at least ⅔ or at least 80% of the volume, of the edge support material is preferably located between the cover layers after anchorage). It is particularly preferred for the support edge to be flush on the outside, or even set deeper, so that, during finishing (for example milling to obtain the necessary planarity) before the actual edge is applied, only perhaps cover layers or a little of the edge support is/are milled off.

Following the anchorage and before the fastening of the edge, a material-removing working step may be performed in order to ensure a smooth finish toward the narrow side, it being possible for material of the cover layers and/or the edge support(s) to be removed.

Although it is therefore preferred for the edge support to be anchored in such a way that it is lying between the cover layers and is not lying against the cover layers at the end sides, nevertheless, according to preferred embodiments, the sonotrode will drive the edge support against the end sides of the cover layers and between the cover layers, while at the same time coupling in mechanical oscillations, by a pressing force in the horizontal direction—i.e. application of force parallel to the plane of the cover layers. The liquefaction of the thermoplastic material in this case takes place at the end sides against the cover layer or the cover layers and/or by friction on the inner surface of the cover layers.

According to one specific embodiment, the rear support comprises a guiding portion, which already lies between the cover layers when the rear support is put in place and before the mechanical oscillations are coupled in, to be precise in such a way that it is in surface-area contact with the inside of both cover layers and thereby acts in a guiding manner during further pressing in by the sonotrode. The guiding portion protrudes beyond contact surfaces with the cover layers into the region between the cover layers (i.e. possibly into the region of the filling).

In order that the mechanical oscillations can be coupled into the edge support, the latter has a corresponding coupling-in surface. In the case of the embodiments mentioned above, with the pressing force in the horizontal direction, this coupling-in surface lies on the rear side (that is to say proximally) and is substantially vertical, and for example approximately parallel to the extent of the narrow side.

According to an alternative embodiment, the pressing force is not exerted horizontally, but vertically by the sonotrode. If that is the case, the sonotrode has a portion which protrudes into the space between the cover layers during the anchoring process. By contrast with the preferred situation when anchorage is effected by a horizontal force—the anchorage in the upper and lower cover layers then does not takes place simultaneously but successively. This embodiment is most particularly preferred in conjunction with edge supports running in the manner of a zigzag or network.

In the case of these embodiments with a vertical pressing force, during the anchoring process the coupling-in surface lies in the interior of the region between the cover layers, and, for example, lies approximately horizontally.

BRIEF DESCRIPTION OF THE DRAWINGS

Embodiments of the invention are described in detail below on the basis of drawings. The drawings are schematic and not to scale. In the drawings, the same designations refer to the same or analogous elements and.

DETAILED DESCRIPTION OF THE INVENTION

The cut-to-size lightweight building board that can be seen in FIGS. 1*a*-1*d* comprises—as also in the embodiments described below—an upper cover layer 1.1 and a lower cover layer 1.2. The cover layers are produced from a derived timber material; for example, they are formed as particle boards, fiberboards or laminated (plywood) boards. The invention is also suitable, however, for the application where the cover layers are made of other materials, under some circumstances materials that are not wood-based, which have sufficient mechanical strength and dimensional stability and comprise structures that are suitable for interpenetration with liquefied thermoplastic material, for example plastic- or metal-based materials, in particular also composite materials.

The thickness of the cover layers may be chosen according to the applications. If the cover layers are made of a derived timber material, the thickness may be, in particular, 10 mm or less, for example between 2 mm and 8 mm, since for such thicknesses there is specifically a need for the edge to be supported.

Arranged between the cover layers is a filling 2. This consists of a material that is light in comparison with the cover layers, for example a honeycomb structure made of card or a similar material. Other fillings forming walls with cavities lying in between are also conceivable, for example regularly arranged strips (the lightweight component is then sometimes referred to as a "multi-wall sheet") or tubular structures. Furthermore, the use of Styropor or similar foams as well as, for example, aluminum honeycombs is also conceivable. Quite generally, the invention is not dependent on the type of filling and works irrespective of the nature of the filling.

Figure 1A:
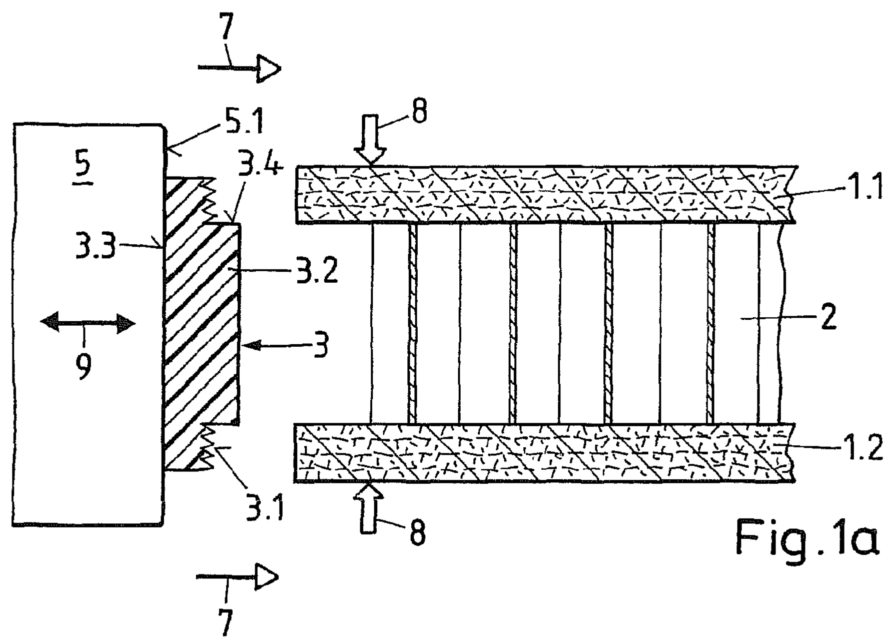
FIGS. 1*a*-*d* show a method according to the invention with a first embodiment of edge supports.
Figure 1B:
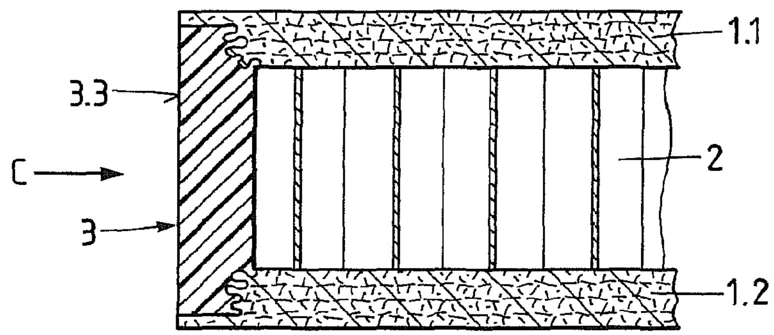
Figure 1C:
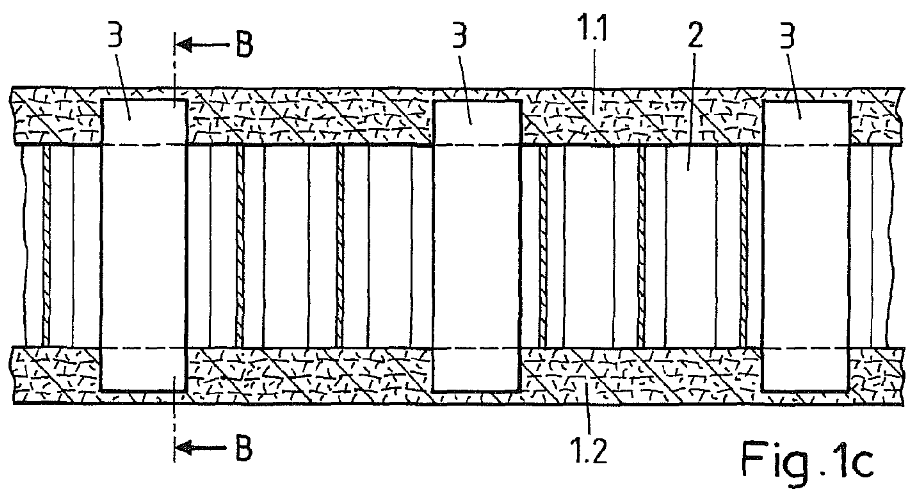
Figure 1D:
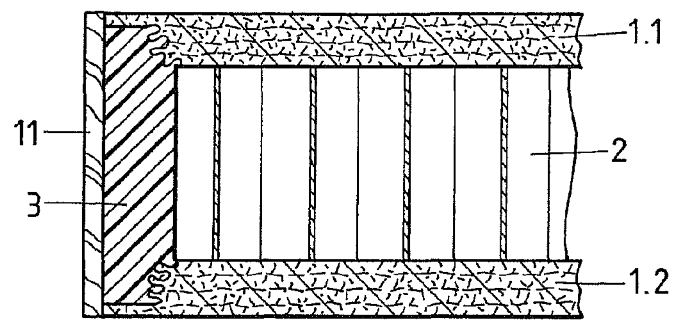

FIGS. 1*a*, 1*b* and 1*d* show sectional representations through a lightweight component during various method steps (corresponding to a section along the line B-B in FIG. 1*c*), and FIG. 1*c* shows a plan view (from the direction of the arrow C in FIG. 1*b*) of a region of the lightweight component during the method according to the invention.

An edge support 3 of the type depicted in FIG. 1*a* consists of a thermoplastic material, for example a polymer such as polyamide, a polycarbonate or a polyester carbonate, or else an acrylonitrile-butadiene-styrene (ABS), styrene acrylonitrile, polymethyl methacrylate, polyvinyl chloride, polyethylene, polypropylene and polystyrene. In addition to the thermoplastic polymer, the material may also comprise suitable fillers, for example reinforcing fibers, for example glass or carbon fibers. Quite generally, all materials with a sufficiently high strength, and sufficiently high modulus of elasticity of, for example, at least 0.5 GPa, that can be locally liquefied by ultrasound are suitable. These materials are generally the same materials that are also suitable for ultrasonic welding. To take an example, ABS is a particularly suitable material.

The edge support 3 has a vertical extent that is a little less than the thickness of the lightweight building board. At the contact surface 3.1 with the cover layers 1.1, 1.2, it comprises energy directors, which are formed for example as projecting corners or ridges tapering to an edge. Furthermore, formed in the region between the cover layers 1.1, 1.2 is a projecting guiding portion 3.2, the vertical extent of which corresponds to the distance between the cover layers 1.1, 1.2. A rear surface 3.3 (with respect to the lightweight board in the configuration of FIG. 1*a*) is substantially planar and suitable as a coupling-in surface for the mechanical oscillations. For the anchorage of the edge support 3 to the narrow side of the lightweight building board, the edge support is positioned on the narrow side and pressed against it (arrows 7). The pressing force is exerted by a sonotrode 5, the coupling-out surface 5.1 of which lies flat against the coupling-in surface 3.3. At the same time, an inwardly directed supporting force (arrows 8) is exerted on the cover layers 1.1, 1.2, and mechanical oscillations 9 are coupled into the edge support 3 through the sonotrode 5. The guiding portion 3.2 thereby ensures that the orientation of the edge support is defined and that no undesired tilting occurs during the subsequent melting.

The mechanical vibrations are, for example, ultrasonic oscillations. In general, oscillations in a frequency range between 2 kHz and 100 kHz, preferably between 10 kHz and 40 kHz, for example about 20 kHz, are used; other frequencies are not ruled out. The power of the device generating the oscillations—a commercially available ultrasonic device may be used—depends on the dimensionings; it may lie in the range between 100 W and 2 kW.

The pressing force 7 (and possibly the supporting force 8) may optionally be exerted already before the mechanical oscillations begin, in order to press the edge support 3 a little into the material of the cover layers already in the region of the contact surface 3.1, which in the subsequent step makes it even easier for the edge support to be guided and can ensure optimum introduction of the mechanical oscillations into the edge support. It is particularly favorable if the supporting force 8 is exerted already before the edge support is placed on, in order to ensure that the cover layers are kept fixed in position during the entire process.

As soon as the mechanical oscillations 9 are coupled in, mechanical energy is absorbed, in particular in the region of the contact surfaces—on account of the energy directors and the friction with the material of the cover layers—and as a result the liquefying of the thermoplastic material is initiated. The material begins to melt and is pressed into the cover layers 1.1, 1.2. At the same time, incipient melting of the thermoplastic material may also take place in the region of the horizontal supporting surfaces 3.4 of the guiding portion, on account of the friction with the cover layers.

After the mechanical oscillations end, the liquefied material sets again, and a stable positively engaging connection with the material of the cover layers is obtained. This is represented in FIG. 1*b*.

This anchoring process is carried out for a plurality of edge supports 3 along the narrow side, the edge supports preferably being arranged at regular intervals, which can be seen particularly well in FIG. 1*c*.

In this case, each edge support may be anchored individually, or a number of edge supports may be inserted simultaneously with the aid of an extended sonotrode, covering a number of edge supports.

This has the overall effect of producing an extended region of the narrow side, which is provided with edge supports in such a way that the edge 11 can be adhesively attached to the flat rear side 3.3, serving in the previous step as a coupling-in surface for the mechanical oscillations. This is illustrated in FIG. 1*d*.

Before the adhesive attachment of the edge, a milling or grinding of the narrow side—including the edge support—may possibly also take place, in order that the lightweight component has a smooth, regular surface in the region of the narrow side.

If an edge support 3 of the type represented in FIG. 1*a* is of a transparent configuration, electromagnetic radiation may be coupled into it instead of or in addition to mechanical vibrations, for example from the rear-side surface 3.3 into the region of the contact surfaces 3.1, the latter being configured by roughnesses, pigments or other means in such a way that the electromagnetic radiation is absorbed there. The absorption has the effect that the thermoplastic material in the region of the interface heats up, and ultimately liquefies, which with the simultaneous exertion of a pressing force 7 can likewise lead to the anchorage as represented in FIG. 1*b*.

Figure 2:
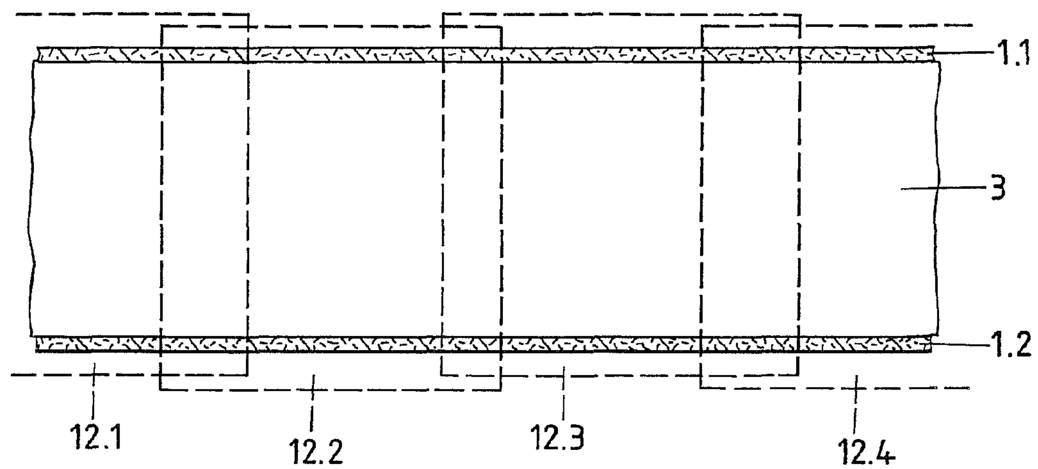
FIG. 2 shows a variant with an endless edge support.

FIGS. 1*a* to 1*d* illustrate the fastening of a plurality of discrete edge supports arranged at regular intervals. Instead, however, a continuous edge support ("endless edge support") may also be used. Such an edge support may, for example, comprise a cross section such as the cross section illustrated in FIG. 1*a* of the discrete edge supports described above. It may be obtained in a continuous process with a sonotrode that is advanced in the manner of a roller or with a sonotrode that is moved over the rear side in the manner of a smoothing iron. However, a continuous edge support may also be fastened portion by portion by an iterative process, which is illustrated in FIG. 2. FIG. 2 shows a view analogous to FIG. 1*c* with a continuous edge support 3. The regions 12.1, 12.2, 12.3, 12.4, which are covered by the sonotrode during the anchoring, are represented by dashed lines. As depicted, they are chosen, for example, to be slightly overlapping.

As represented in FIG. 2, the continuous edge support may also comprise, on the rear side, a corresponding decoration and form the edge, in particular if the edge is in any case constructed as a laminate.

Figure 3A:
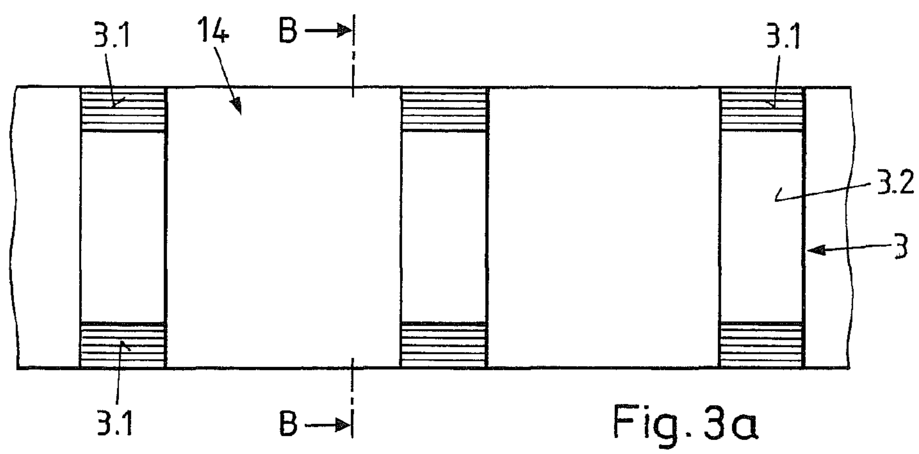
FIGS. 3*a* and 3*b* show a continuous strip provided with edge supports.
Figure 3B:
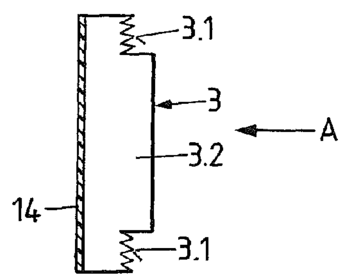

If, as in FIGS. 1*a*-1*d*, discrete edge supports are anchored, it may be of advantage if the edge supports 3 do not have to be placed individually but are supplied in a form in which they are fastened at the ideal intervals on a connecting element, for example a strip. This is illustrated in FIGS. 3*a* and 3*b*. FIG. 3*a* shows a front view—i.e. a view from the lightweight component side (arrow A in FIG. 3*b*)—of such an arrangement. FIG. 3*b* shows the representation of a section along the line B-B in FIG. 3*a*. The edge supports 3 in FIGS. 1*a*-1*d* of the type depicted are adhesively attached on the strip 14 or welded onto the strip. After the anchorage of the edge supports 3, the strip 14 may be pulled off in a process of the type described on the basis of FIGS. 1*a* to 1*d*, or it may also remain where it is, so that its rear side serves as an adhering location for the attachment of the edge 11. As a further alternative, the strip may be supplied in a relatively stable form and already be provided with the desired decoration on the rear side, so that it serves itself as the edge. If the connecting element does not serve as the edge, it does not have to be configured as a strip, but may, for example, also be a network, an assembly of a number of relatively narrow strips arranged next to one another or some other flexible connecting means defining the distances between the edge supports.

Figure 4:
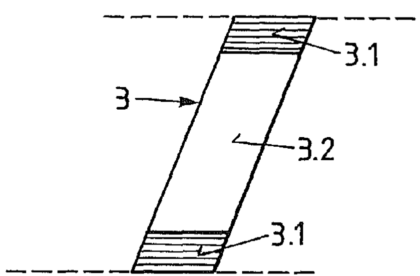
FIG. 4 shows an edge support placed at an angle.

The variant of the edge support depicted in FIG. 4 differs from those of FIGS. 1*a*-1*d* and 3*a*-3*b* in that, on account of its outer form and the form of the guiding portion, it is at an angle when it is placed in contact with the lightweight component. This has advantages in particular whenever, following the anchorage, the narrow side is also milled or ground. In the case of a straight arrangement—i.e. if the edge support is perpendicular on the flat sides—there is the risk of the edge support as a whole being caught by a milling or grinding head and, in the worst case, torn out. The angled position allows the head to act continuously on the edge support.

The angled position of the edge support also makes it possible for the edge to be supported over a greater length.

The variant according to FIG. 4 may optionally—as indicated by the dashed lines—likewise be pre-assembled on a strip.

Figure 5A:
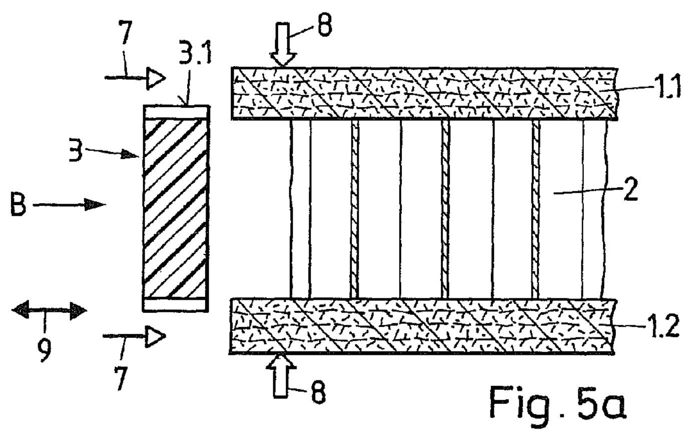
FIGS. 5*a* and 5*b* show a method according to the invention with a further embodiment of an edge support.
Figure 5B:
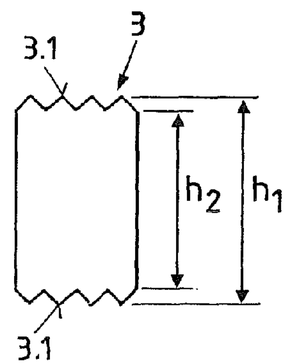

FIGS. 5*a* and 5*b* show an embodiment in which, in the anchored state, the contact surfaces 3.1 with the energy directors do not lie against the narrow side at the end but lie against the inside of the cover layers 1.1, 1.2 adjacent to the narrow side. An outer height $h_1$, i.e. the height measured between the edges or tips of the energy directors, is in this case dimensioned such that it is greater than the distance between the cover layers 1.1, 1.2. In other words, when the edge support 3 is inserted between the cover layers, the energy directors are against said cover layers, so that, as in the case of the examples described above, a horizontal pressing force 7 can be applied along the plane of the lightweight component. An inner height $h_2$, i.e. a height without the energy directors, may correspond approximately to the distance between the cover layers.

In the embodiment according to FIGS. 5*a* and 5*b*, the anchorage takes place primarily on the inside of the cover layers. The embodiment has the advantage that the edge support can disappear completely between the cover layers, i.e. pressing force 7 and mechanical oscillations 9 can be applied until the sonotrode is against the cover layers at the ends. In the case where the sonotrode is formed in such a way, the edge support can even be recessed just a little.

Even if in the case of the edge support of this embodiment there is no guiding portion projecting beyond the contact surface 3.1, the actual edge support body (i.e. the edge support without the energy directors) can act in a guiding manner during introduction if the inner height $h_2$ is chosen to correspond to the distance between the cover layers. This also applies if the edge support according to FIG. 5*a* and FIG. 5*b* is formed at an angle by analogy with FIG. 4.

Also in the case of edge supports of this embodiment, a supporting force 8 is exerted on both cover layers. The supporting force 8 is especially important here, since the introduction of the edge support according to FIGS. 5*a* and 5*b* would have the tendency to push the two cover layers apart if no supporting force were present.

The embodiment according to FIGS. 5*a* and 5*b*—like that according to FIGS. 1*a*-1*d*—may also be brought about by the anchorage of individual edge supports, the anchorage of a number of edge supports connected to one another by a strip (or network or the like; a strip may optionally form the edge) or by the anchorage of a continuous edge support (with or without an edge).

It is a preferred principle of the invention that the sonotrode acts on the edge support from the narrow side—that is to say not through the cover layers. In the embodiments described above, the pressing force 7 acts from the end side, that is to say horizontally. An embodiment in which the sonotrode likewise acts on the edge support from the narrow side, but in which the pressing force is applied vertically, is described below on the basis of FIGS. 6*a* and 6*b*.

Figure 6A:
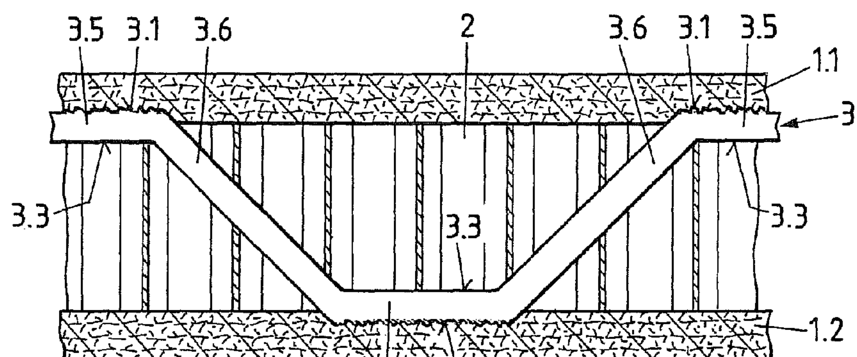
FIGS. 6*a* and 6*b* show a method according to the invention with yet another embodiment of an edge support.
Figure 6B:
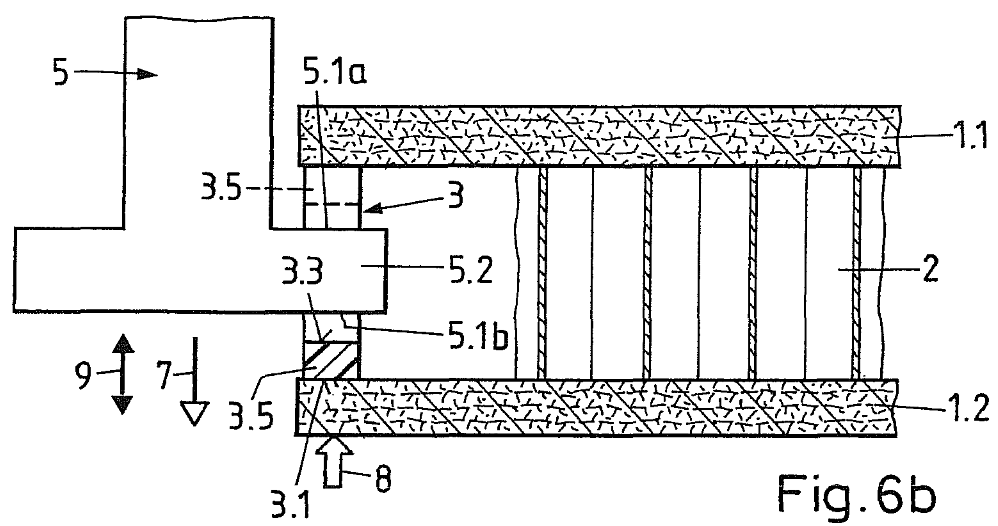

FIG. 6*a* shows a view analogous to FIG. 1*c* from the front side; FIG. 6*b* shows a sectional representation with a sonotrode. As can best be seen in FIG. 6*a*, the edge support 3 runs continuously, that is to say as in FIG. 2 as an "endless edge support". The edge support 3 comprises horizontal regions 3.5, which respectively lie with the contact surface 3.1 against one of the cover layers 1.1 and 1.2, as well as transitional regions 3.6 connecting these horizontal regions. The horizontal regions 3.5 are respectively located alternately on the inside of the upper cover layer 1.1 and of the lower cover layer 1.2.

FIG. 6*b* illustrates how the edge support 3 according to FIG. 6*a* is anchored in the lightweight component. The sonotrode has the form of a T or L piece with a laterally protruding portion 5.2, which is inserted into the intermediate space between the cover layers 1.1, 1.2. The upper side 5.1*a* and the underside 5.1*b* of this portion form the coupling-out surfaces for the anchorage of an upper horizontal region 3.5 in the upper cover layer 1.1 and a lower horizontal region 3.5 in the lower cover layer. FIG. 6*b* illustrates the situation during the anchorage of a lower horizontal region 3.5. The pressing force 7 is downwardly directed. In this embodiment, the supporting force 8 is at the same time the counter force opposing the pressing force. In the case of the anchorage on the underside, it can be applied simply by the lightweight component resting on a horizontal underlying surface. In the case of the anchorage of the upper horizontal regions—with an upwardly directed pressing force—the counter force—then acting on the upper cover layer 1.1—is advantageously actively applied.

During the anchorage of the edge support 3, for example, upper and lower regions are anchored alternately along the narrow side. However, it is also possible, for example, first to anchor all the upper regions and then to anchor all the lower regions. Optionally, this may be accompanied by turning the lightweight component as a whole around. In the latter case, active application of the counter force may be made superfluous, in that during the anchoring there is always downward pressing and the supporting force can always be applied by the underlying surface against which the pressing force is directed.

The attachment of the edge with the decoration takes place by analogy with the above embodiments; here, too, a milling or grinding of the narrow side may take place in advance. This embodiment is even particularly suitable for this, since, as illustrated, the edge support can be anchored such that it is set back with respect to the end side of the cover layers. If it is done in this way, it is necessary for the cover layers to be removed until they are flush with the edge support, in order for adhesive attachment of the edge to become possible.

As a difference from the embodiments described above, however, in the case of the example according to FIGS. 6*a* and 6*b*, of course, the coupling-in surface does not serve as the rear-side surface for fastening the edge, but the outer surface.

Figure 7:
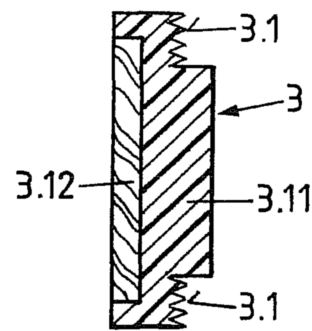
FIG. 7 shows a variant of an edge support with a hybrid structure.

Many other embodiments besides are conceivable, for example with network- or grid-like edge supports, differently formed sonotrodes, etc. It is also possible to construct the edge support from a number of materials and not just from one material, as in the examples illustrated above. FIG. 7 shows an edge support 3, which comprises, at least in the region of the contact surface 3.1, a thermoplastic part 3.11 and a non-thermoplastic part 3.12, for example of a building material containing wood. If such a part 3.12 is attached on the rear side, that may be particularly advantageous, for example, for the adhesive bonding with the edge.

Figure 8A:
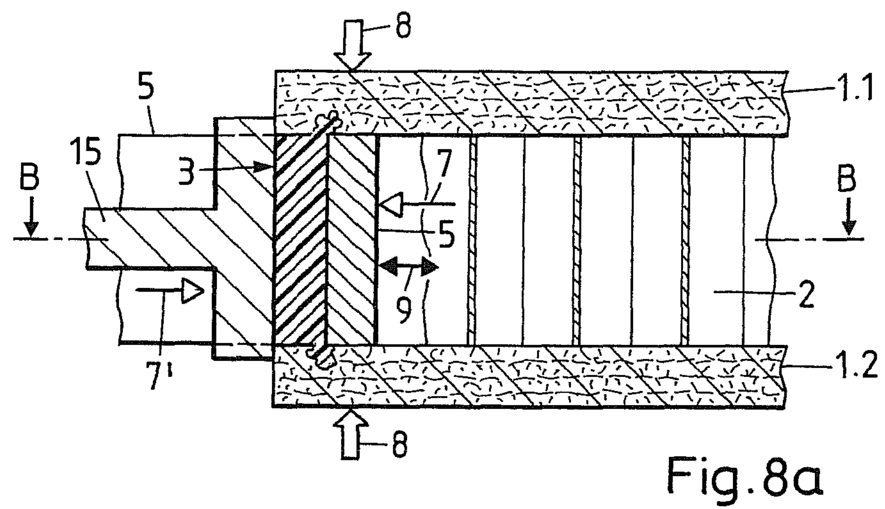
FIGS. 8*a* and 8*b* show a method with a further embodiment of edge supports in another configuration.
Figure 8B:
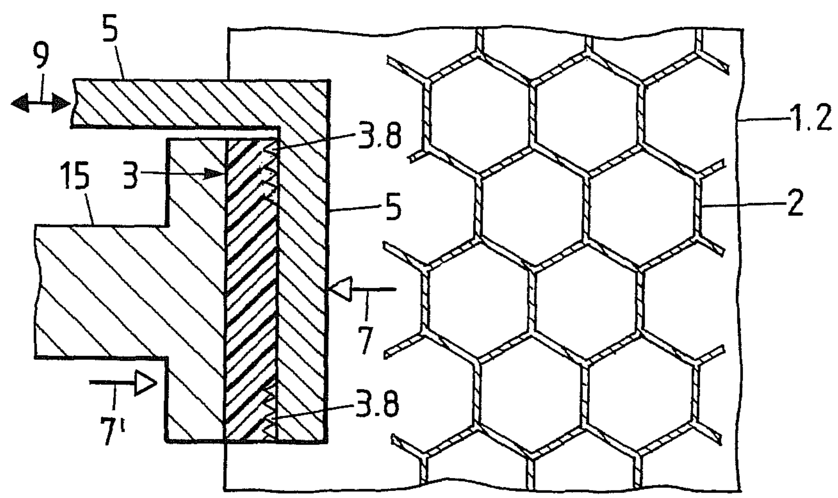

Depicted in FIGS. 8*a* and 8*b* is an arrangement in which the sonotrode 5 acts on the inside of the edge support 3 and exerts the pressing force 7 from the inside. FIG. 8*a* shows a sectional representation analogous to FIGS. 1*a*, 1*b*, 1*d*, 5*a* and 6*b*; FIG. 8*b* shows a section along the line B-B in FIG. 8*a*. The mechanical vibrations 9 are coupled into the sonotrode 5, which engages behind the edge support in an L-shaped manner. A counter element 15 is used to apply the necessary counter force 7'. The liquefaction takes place here in the region of the interface between the sonotrode 5 and the edge support 3, it being possible for the edge support to comprise energy directors 3.8, whereby the liquefaction reliably takes place directly at the interface on account of the vibrations coupled into the edge support. As indicated in FIG. 8*a*, on account of the pressing force, the liquefied thermoplastic material is displaced upward and downward and forced into structures of the cover layers, which brings about the anchorage. Even if the penetration of the cover layers with thermoplastic material will generally not be as intensive as when the edge support itself is pressed against the cover layer and liquefied in contact with it, even with this procedure sufficient anchorage can nevertheless be obtained.

In an arrangement that is virtually identical to FIGS. 8*a* and 8*b*, the mechanical vibrations can also be coupled into the edge support 3 from the outside, the liquefaction taking place in contact with the counter element. In such an arrangement, the roles of the sonotrode and of the counter element are changed over in FIGS. 8*a* and 8*b*, i.e. 15 then refers to the sonotrode and 5 refers to the counter element. The vibrations 9 are then coupled into the sonotrode 15; 7' refers to the pressing force and 7 refers to the counter force.

The method according to FIGS. 8*a* and 8*b* or the variant thereof can also be carried out by energy other than mechanical energy, for example heat, being coupled into the edge support. Instead of a sonotrode, a heating element is then used as the tool.

The invention claimed is:

1. A method for fastening an edge to a lightweight component having two cover layers and a filling arranged between the cover layers, the method comprising the following method steps:

providing an edge support comprising a thermoplastic material;

anchoring the edge support in both cover layers, wherein the step of anchoring comprises the sub-steps of:

bringing the edge support into contact with the respective cover layer, coupling mechanical vibrations into the edge support by a sonotrode acting from the narrow side, pressing, while the mechanical vibrations are coupled into the edge support, the edge support against this cover layer in such a way that, in the region of an interface between the thermoplastic material and the cover layer, part of the thermoplastic material is liquefied and forced into the cover layer, by which means a positively engaging anchorage is obtained after hardening of the thermoplastic material;

the method comprising the further steps of:

carrying out or repeating the step of anchoring until an extended region of the narrow side is provided with the edge support or with a plurality of edge supports;

fastening an edge to an outer surface of the edge support in such a way that, in said extended region, the intermediate space between the cover layers is closed toward the narrow side.

2. The method according to claim 1, wherein the step of fastening the edge to the outer surface takes place before the step of anchoring and, already during production.

3. The method according to claim 1, wherein the step of fastening the edge to the outer surface takes place after the step of anchoring.

4. The method according to claim 3, wherein between the steps of anchoring of fastening the edge, a processing step is performed in which material of the cover layers and/or material of the edge support or the edge supports is removed in said extended region of the narrow side.

5. The method according to claim 1, wherein the edge support comprises first regions running parallel to the cover layers, and transitional regions connecting said first regions, wherein during the anchorage the first regions are pressed against the inside of one of the cover layers by the sonotrode, by a force acting perpendicularly to the cover layers.

6. The method according to claim 5, wherein the transitional regions run at such an angle that the edge support as a whole comprises a zigzag course, with first regions lying alternately against the first cover layer and against the second cover layer, or a web-like structure.

7. The method according to claim 1, wherein the edge support is anchored simultaneously in the upper and lower cover layers.

8. The method according to claim 7, wherein a plurality of discrete edge supports, optionally connected to one another by a connecting element, are anchored, wherein during the step of anchoraging, the respective edge support is pressed against the cover layers from the narrow side, by a force applied parallel to the cover layers.

9. The method according to claim 8, wherein after the step of anchoraging, the edge supports comprise a body-like region running between, and connecting, the cover layers.

10. The method according to claim 9, wherein the edge supports comprise a guiding portion, which is inserted between the cover layers before the coupling-in of the mechanical vibrations and is in surface-area contact with the inside of both cover layers.

11. The method according to claim 9, wherein, before the step of anchoring, the edge supports comprise an extent perpendicular to the cover layers that is greater than the distance between the cover layers, and in that, after the step of anchoring, the edge supports are located completely between the cover layers.

12. The method according to claim 1, wherein, during the step of anchoring the edge support, an inwardly directed supporting force is exerted on the cover layer or the cover layers.

13. A method for producing a lightweight component with the steps of:

providing a lightweight building board comprising two cover layers and a filling arranged in between;

detaching a cut-to-size piece from the lightweight building board;

fastening an edge to the cut-to-size piece by a method as claimed in claim 1.

14. An edge support for use in a method according to claim 1, comprising a thermoplastic material, which forms contact surfaces for lying against both cover layers of a lightweight component, wherein the edge support as a whole is shaped in such a way that, when the contact surfaces are lying against the cover layers, the edge support is free from elements protruding vertically beyond the cover layers, and wherein the edge support also comprises a coupling-in surface for coupling in mechanical oscillations while at the same time at least one of the contact surfaces is being pressed against one of the cover layers in such a way that thermoplastic material in the region of the contact surface is liquefied and pressed into the cover layer, and wherein the edge support comprises at least regions which are formed to run in the region between the cover layers after the coupling-in of the mechanical oscillations, and also form an outer fastening surface, running perpendicularly to the cover layers and parallel to the course of the narrow side, for fastening an edge with a decoration, or comprise such an edge with a decoration.

15. The edge support according to claim 14, further comprising energy directors in the region of the contact surfaces.

* * * * *